United States Patent
Arunkumar et al.

(10) Patent No.: US 9,571,505 B2
(45) Date of Patent: Feb. 14, 2017

(54) TRUSTWORTHINESS OF PROCESSED DATA

(71) Applicant: INTERNATIONAL BUSINESS MACHINES CORPORATION, Armonk, NY (US)

(72) Inventors: Saritha Arunkumar, Basingstoke (GB); Stephen D. Pipes, Winchester (GB); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 14/556,631

(22) Filed: Dec. 1, 2014

(65) Prior Publication Data

US 2015/0156185 A1  Jun. 4, 2015

(30) Foreign Application Priority Data

Dec. 4, 2013  (GB) .................................. 1321349.1

(51) Int. Cl.
*H04L 29/00* (2006.01)
*H04L 29/06* (2006.01)

(52) U.S. Cl.
CPC .............. *H04L 63/105* (2013.01); *H04L 63/08* (2013.01)

(58) Field of Classification Search
CPC ................................ H04L 63/08; H04L 63/105
See application file for complete search history.

(56) References Cited

U.S. PATENT DOCUMENTS

| | | | |
|---|---|---|---|
| 8,290,960 B2 | 10/2012 | Li et al. | |
| 2006/0277591 A1* | 12/2006 | Arnold | G06F 21/62 726/1 |
| 2007/0233861 A1* | 10/2007 | Cai | H04L 12/585 709/225 |
| 2009/0007227 A1* | 1/2009 | Burgess | G06F 21/316 726/1 |
| 2009/0024589 A1* | 1/2009 | Sood | G06F 17/30893 |
| 2010/0049974 A1* | 2/2010 | Winjum | H04L 63/105 713/166 |
| 2012/0317085 A1 | 12/2012 | Green et al. | |
| 2013/0145419 A1* | 6/2013 | Hu | G06Q 10/063 726/1 |
| 2014/0297395 A1* | 10/2014 | Chao | G06Q 30/0242 705/14.41 |

(Continued)

OTHER PUBLICATIONS

Lalana Kagal, Ian Jacobi, and Ankesh Khandelwal; "From Truth Maintenance to Trust Management on the Semantic Web", Rensselaer Polytechnic Institute; 2010, citeseerpages 1-13.*

(Continued)

*Primary Examiner* — Mohammad A Siddiqi
(74) *Attorney, Agent, or Firm* — Law Office of Jim Boice

(57) ABSTRACT

A method and/or computer program product indicates a trustworthiness of data processed in accordance with a processing rule. A first trust weight is assigned to a data item to be processed to provide a weighted data item, the first trust weight representing a level of trust in the data item. A second trust weight is assigned to the processing rule to provide a weighted processing rule, the second trust weight representing a level of trust in the processing rule. The weighted data item is processed in accordance with the weighted processing rule to generate a data output and an indication of a level of trust in the data output.

18 Claims, 4 Drawing Sheets

(56) References Cited

U.S. PATENT DOCUMENTS

2015/0135277 A1* 5/2015 Vij ...................... H04L 63/0892
726/4

OTHER PUBLICATIONS

S. Arunkumar et al., "Trust Assessment When Observing and Orienting With Uncertain, Multi-source Streaming Informafion," in Proceedings of ACITA, 2012, pp. 1-8.
GB Patent Application No. 1321349.1, Examination Opinion mailed May 14, 2014.
J. Newsome and D. Song, "Dynamic Taint Analysis for Automatic Detection, Analysis, and Signature Generation of Exploits on Commodity Software", In Proceedings of the Network and Distributed System Security Symposium (NDSS 2005), 2005, pp. 1-17.
A Fokoue et al., "Assessing Trust in Unceratin Information Using Bayesian Description Logic", ACM, CCS 2010, 2010, pp. 1-3.

* cited by examiner

TRUSTWORTHINESS OF PROCESSED DATA

STATEMENT REGARDING FEDERALLY SPONSORED RESEARCH OR DEVELOPMENT

This invention was made with Government support under Contract Number W911NF-06-3-0001 awarded by the United States Army. The Government has certain rights to this invention.

BACKGROUND

The invention relates to the trustworthiness of processed data. More particularly, the invention relates to indicating the trustworthiness of data that has been processed in accordance with a processing rule.

Consumers (including humans or software agents) of information may be uncertain as to its trustworthiness. This is particularly problematic for situations where information is based on large amounts of data originating from different sources. Although attempts have been made to address the problem of indicating the trustworthiness of data, such attempts have relied on assumptions that compromise the accuracy and/or usefulness of the indication(s) provided.

SUMMARY

In one or more embodiments of the present invention, a method and/or computer program product indicates a trustworthiness of data processed in accordance with a processing rule. A first trust weight is assigned to a data item to be processed to provide a weighted data item, the first trust weight representing a level of trust in the data item. A second trust weight is assigned to the processing rule to provide a weighted processing rule, the second trust weight representing a level of trust in the processing rule. The weighted data item is processed in accordance with the weighted processing rule to generate a data output and an indication of a level of trust in the data output.

In an embodiment of the present invention, an apparatus for indicating a trustworthiness of data processed in accordance with a processing rule comprises: a data weighting hardware unit adapted to assign a first trust weight to a data item to be processed to provide a weighted data item, the first trust weight representing a level of trust in the data item; a processing rule weighting hardware unit adapted to assign a second trust weight to the processing rule to provide a weighted processing rule, the second trust weight representing a level of trust in the processing rule; and a processing hardware unit adapted to process the weighted data item in accordance with the weighted processing rule to generate a data output and an indication of a level of trust in the data output.

BRIEF DESCRIPTION OF THE DRAWINGS

Embodiments of the invention will now be described, by way of example only, with reference to the accompanying drawings in which.

DETAILED DESCRIPTION

Figure 1:
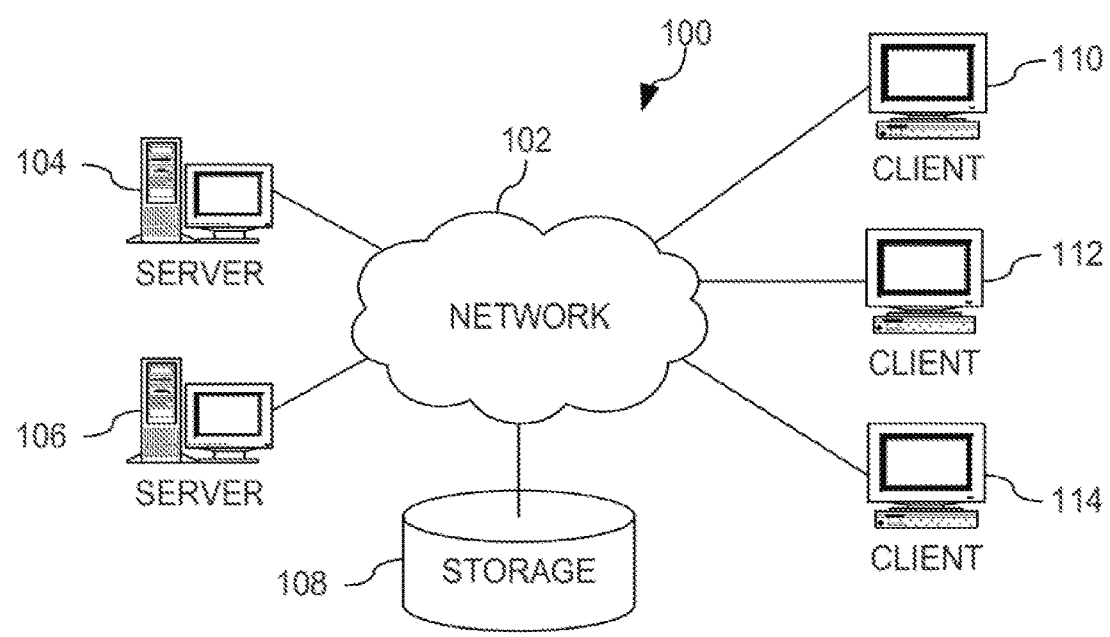
FIG. 1 depicts a pictorial representation of an example distributed data processing system in which aspects of the illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments provide concepts for indicating the trustworthiness of data that has been processed in accordance with one or more processing rules. The concepts may employ a "possible world" interpretation to both data and processing rules which enables the propagation of trust information from facts (e.g. trusted data) through to conclusions (e.g. output data). Such an approach employs the association of trust information (such as weightings) to data and the data processing rules, thereby catering for the propagation of an indication of trust across both data and processing rules.

Embodiments may therefore be said to apply an interpretation of trust to both data and processing rules. This may therefore cater for the variable nature of the trust of a set of data processing rules.

Figure 2:
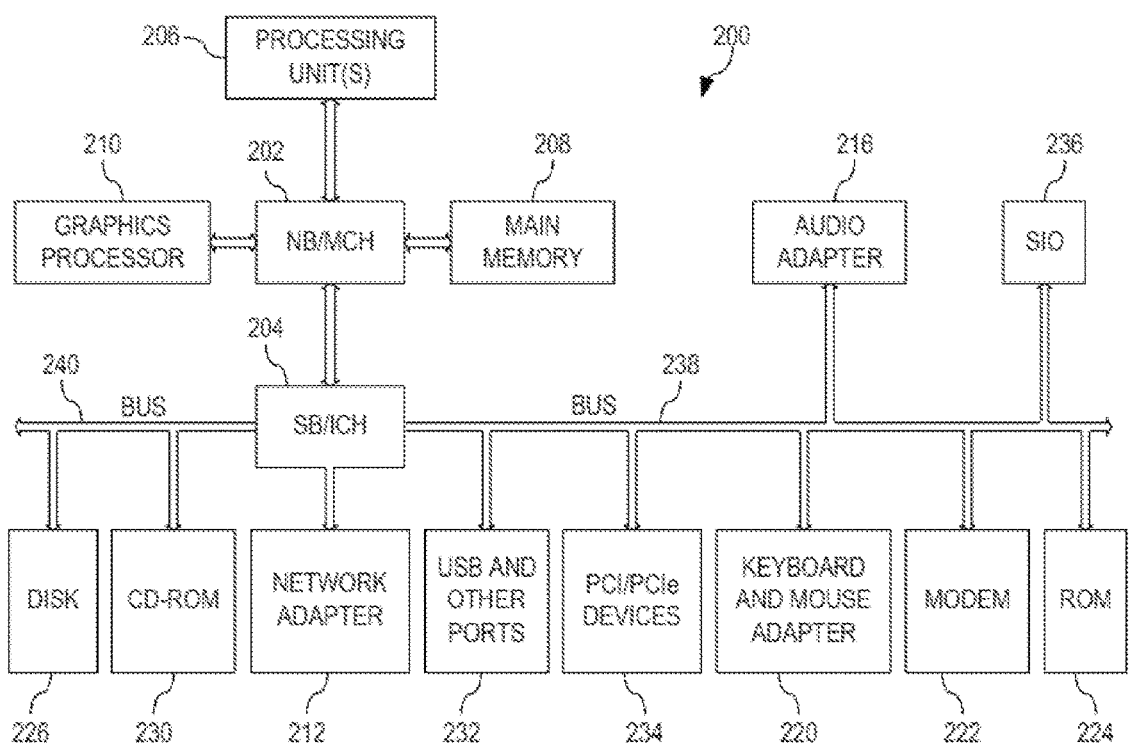
FIG. 2 is a block diagram of an example data processing system in which aspects of the illustrative embodiments may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed data processing system 100 may include additional servers, clients, and other devices not shown.

In the depicted example, the distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system 200 in which aspects of the illustrative embodiments may be implemented. The data processing system 200 is an example of a computer, such as client 110 in FIG. 1, in which computer usable code or instructions implementing the processes for illustrative embodiments of the present invention may be located.

In the depicted example, the data processing system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, the data processing system 200 may be a portable computing device that is configured with flash memory to provide non-volatile memory for storing operating system files and/or user-generated data, for example. Thus, the data processing system 200 may essentially be any known or later-developed data processing system without architectural limitation.

The proposed invention enhances a data processing system (such as that depicted in FIG. 2) by providing for the propagating of trust information from raw facts (e.g. data) through to conclusions (e.g. the result(s) of processing data). Embodiments may intercept steps undertaken in a data processing system which may result in the modification of an existing fact and/or the creation of a new (inferred) fact.

Conventional data processing systems typically assume that input facts (e.g. data) and data processing rules are trusted. Conversely, proposed embodiments employ the assumption that neither input facts (e.g. data) nor data processing rules may be fully trusted. To account for this assumption, embodiments propose indicating the trustworthiness of both data and data processing rules and propagating the indication(s) through data processing procedures to an output result. The output result may then be provided with an indication of trustworthiness, wherein the indication has accounted for both the trustworthiness of the processed data and the processing rules used to process the data.

The indication of trustworthiness may be provided as annotations to the data and the processing rules. For examples, such annotations may be provided as part of metadata associated with the data and processing rules.

The annotations may be selected from a set of possible trust values (e.g., b=belief, d=disbelief, u=uncertainty), the selected value being representative of a determined level of trust in the data or processing rule. A trust value may be of any suitable form which provides a representation of a level of trust, such as a numerical value in a predetermined range or one of a defined set of values. Such annotations may therefore be used to support a "possible world" interpretation of both processing rules and data. In other words, an annotation may enable an associated data item or processing rule to exist in one of a set of possible trust states (e.g. true, false, or uncertain). The use of such Subjective Logic (SL) enables representation of possible world interpretations and also enables the generation of trust annotations for processing outputs (e.g. a modified data item or new data item). This allows the proposed trust propagation concept to be used in iterative (e.g., SQL) and recursive (e.g., Prolog) data processing systems.

Figure 3:
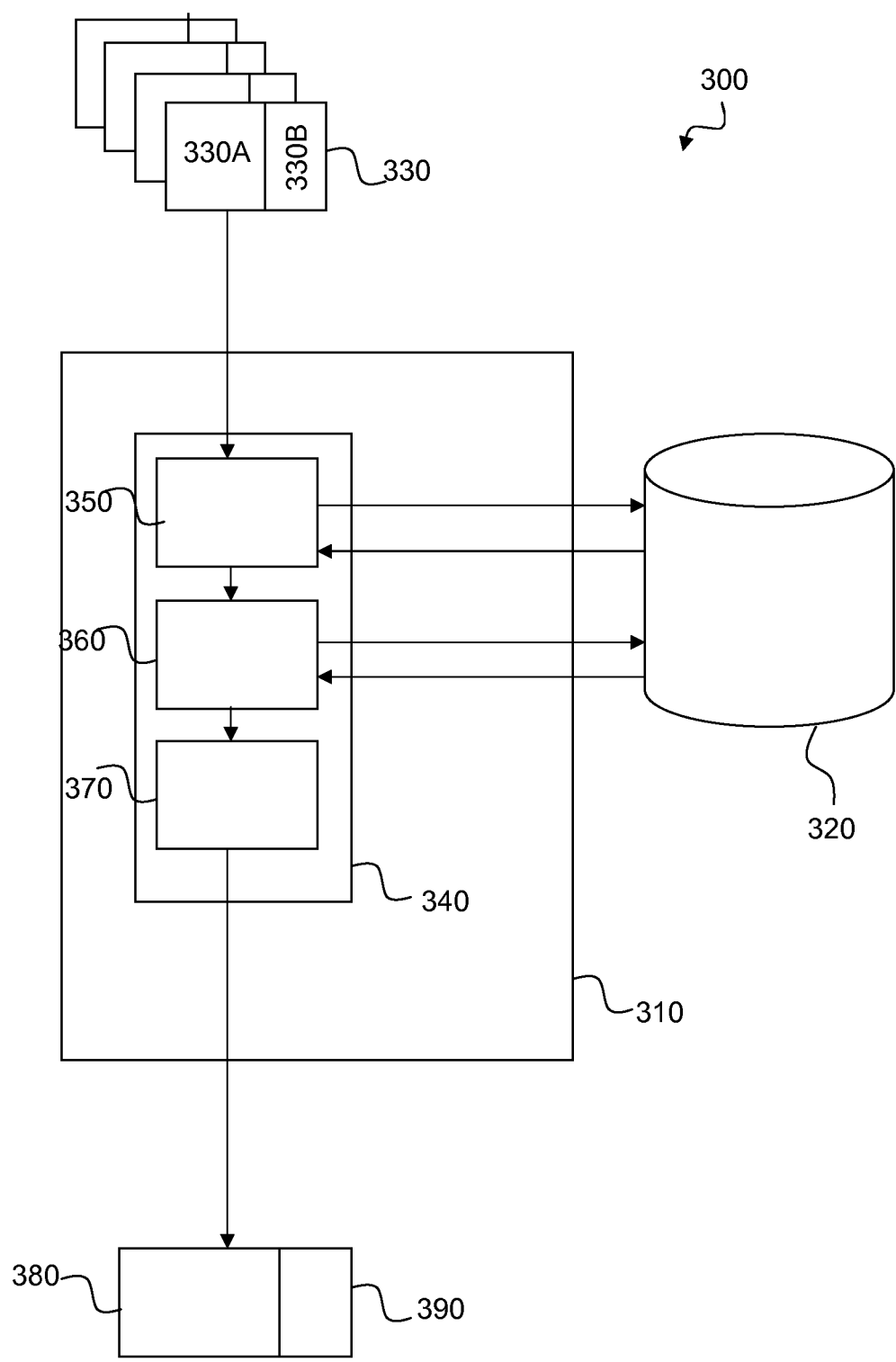
FIG. 3 depicts a data processing system according to an embodiment of the present subject matter.

Referring to FIG. 3, there is depicted a data processing system 300 according to an embodiment of the present subject matter. The data processing system 300 comprises a data processing unit 310 and a data storage unit 320. The data processing unit 310 is adapted to receive a plurality of data items 330 for processing by a trust processing unit 340 of the data processing unit 310.

Here, each of the plurality of data items 330 comprises a piece/unit of data 330A with associated metadata 330B. The metadata 330B may comprise information regarding the associated piece/unit of data 330A such as: a source of the data item 330A; a time associated with the data item 330A; a date associated with the data item 330A; a creator of the data item 330A; and an age of the data item 330A, for example.

Trust processing unit 340 comprises a data trust assigning unit 350 that is adapted to receive a data item 330 and assign a trust weight to the data item 330, the assigned trust weight representing a level of trust in the data item 330. Here, in order to assign a trust weight to a data item 330, the data trust assigning unit 350 determines a level of trust in the data item 330 based on the metadata 330B associated with the data item. More specifically, the data trust assigning unit 350 extracts the metadata 330B from the data item and compares information in the extracted metadata 330B with information stored in the data storage unit 320. For example, the extracted metadata 330B may indicate the author of the associated data item 330A, and the data storage unit 320 may be adapted to store a lookup table comprising a list of authors and their associated level of trust (e.g. trust value). Based on the extracted metadata 330B, a trust value for the data item may be determined from information stored in the data storage unit, the trust value being representative of a level of trust in the data item 330. The data trust assigning unit 350 may then assign the trust value to the data item as a trust weight representing a level of trustworthiness of the data item 330.

Here, a trust value may be a value in the range of zero (0) to one (1), wherein a trust value of zero (0) indicates the lowest possible level of trust (i.e. completely untrusted, and thus assumed false), and wherein a trust value of one (1) indicates the highest possible level of trust (i.e. completely trusted, and thus assumed true). Use of numerical trust values may enable simple mathematical processing of multiple trust values to be undertaken so as to determine a combined trust value. For example, two numerical trust values (in the range of zero to one) may be multiplied together so as to calculate an overall/combined trust value (also in the range of zero to one). Alternatively, the average value of multiple trust values may be calculated as the overall/combined trust value.

Trust processing unit 340 also comprises a rule trust assigning unit 360 that is adapted to receive a data processing rule and assign it a trust weight, the assigned trust weight representing a level of trust in the data processing rule. Here, in order to assign a trust weight to a data processing rule, the rule trust assigning unit 360 determines a level of trust in the data processing rule based on the metadata associated with the data processing rule. More specifically, the rule trust assigning unit 360 extracts metadata about the data processing rule and compares information in the metadata with information stored in the data storage unit 320. For example, the metadata may indicate the author of the associated data processing rule, and the data storage unit 320 may be adapted to store a lookup table comprising a list of authors and their associated level of trust (e.g. trust value). Based on the extracted metadata, a trust value for the data processing rule may be determined from information stored in the data storage unit, the trust value being representative of a level of trust in the data processing rule. The rule trust assigning unit 360 may then assign the trust value to the data processing rule as a trust weight representing a level of trustworthiness of the data processing rule.

The data item(s) 330, data processing rule(s), and their assigned trust weight are provided to an output generation unit 370 of the trust processing unit 340. The output generation unit 370 is adapted to process the data item(s) 330 in accordance with the data processing rule(s) so as to generate a data output 380. The output generation unit 370 is also adapted to process the assigned trust weights in accordance with an algorithm to generate an associated indication of a level of trust 390 in the data output 380. For example, where the trust weights are numerical values in the range of zero (0) to one (1), the trust weights may be multiplied together so as to determine a numerical value (also in the range of zero) indicating a level of trust in the data output. Alternatively, the average value of trust weight values may be calculated and used as the level of trust in the data output. In this way, the trust processing unit 340 may provide an indication 390 of a level of trustworthiness of the output data 380, wherein the indication of trustworthiness 390 is based on an indicated trustworthiness of both the processed data and the rules used to process the data.

In alternative embodiments, a family of SL operators may be used to compute trust metadata, including complement, consensus, discounting, disjunction, conjunction and deduction. Examples of each of these SL operators may be described as follows:

Complement: each opinion implies a complementary opinion. For instance, if the proposition 'x' "Dust storm in location X" has a probability of 0.5 and a sensor's opinion of x (as a SL triple [belief, disbelief, uncertainty] plus the priori probability of the proposition) is (0.75, 0.1, 0.15, 0.5) then the (complementary) opinion "No dust storm in location X" is (0.1, 0.75, 0.15, 0.5).

Consensus: If another sensor has an opinion, the two sensor opinions can be fused into a single opinion using the consensus operator. For instance, sensor 1 (0.75, 0.1, 0.15, 0.5) and sensor 2 (0, 0.7, 0.3, 0.5) may fuse under consensus to (0.55, 0.34, 0.11, 0.5).

Discounting: The discounting operator allows normalization of opinions based on the trustworthiness of their owners.

Given opinions about different propositions, conjunction and disjunction operators may be used to derive the conjunction and disjunction of the propositions.

The deduction operator is used to deduce new opinions from existing ones.

Embodiments may therefore employ a trust analytics function which applies SL operators to assess trust of opinion.

It will be appreciated that in the example of FIG. 2, the data trust assigning unit 350 is adapted to assign a trust value to a data item based on an evaluation of the data item. Such evaluation may take into account supplementary information about the data item, which may be provided as metadata associated with the data item for example. The evaluation process may also take account of information stored in a database (provided by data storage unit 320 for example) indicating levels of trust associated with information values.

The evaluation process may therefore combine multiple pieces of information, and their associated levels of trust, so as to determine a single trust value for a data item. Put another way, multiple indications of trust may be combined (or flattened) so as to provide a single indication of trust which provides an overall representation of the multiple indications of trust.

Similarly, it will be appreciated that in the example of FIG. 3, the rule trust assigning unit 360 is adapted to assign a trust value to a processing rule based on an evaluation of the processing rule. Such evaluation may take into account supplementary information about the processing rule, which may be provided as metadata associated with the processing rule for example. The evaluation process may also take account of information stored in a database (provided by data storage unit 320 for example) indicating levels of trust associated with information values. The evaluation process may therefore combine multiple pieces of information, and their associated levels of trust, so as to determine a trust value for a processing rule.

From the example described above with reference to FIG. 3, it will be appreciated that embodiments may include the following components or concepts:

'Background Knowledge' may be employed (in a database for example) in order to assist in assessment of the trustworthiness of data and/or processing rules. Such knowledge may enable a real world interpretation to be taken of data and/or processing rules that may otherwise be assumed to be trusted;

Pre-asserted trustworthiness of data and/or processing rules may be queried and and/or assessed to supplement a trust evaluation process; and An output indication of trustworthiness may be provided as a single value, thus combining all trust indications into a single, flattened interpretation in the assessed facts.

Figure 4:
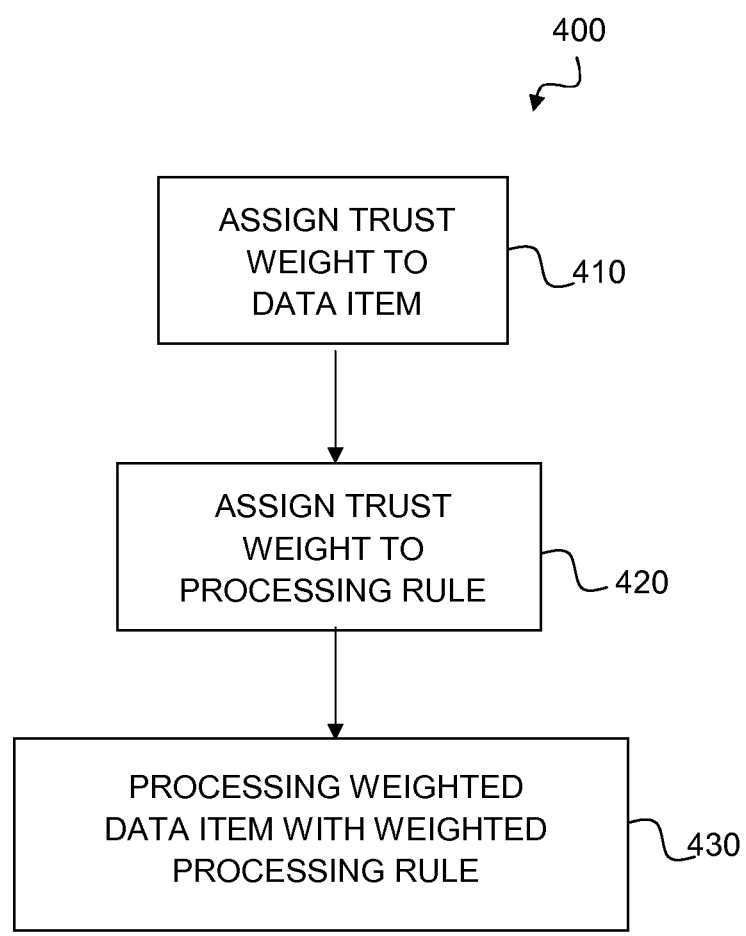
FIG. 4 is a flow chart of an example of an implementation of method according to an embodiment of the present subject matter.

FIG. 4 is a flow chart of an example of an implementation of method according to an embodiment of the present subject matter. FIG. 4 shows the steps of the method carried out by a processing system, such as the system in FIG. 2 or 3, according to one example of the present subject matter.

First, in step 410, a first trust weight is assigned to a data item to be processed so as to provide a weighted data item. The first trust weight is chosen so as to represent a determined level of trust in the data item. Here, a level of trust in the data item is determined based on metadata associated with the data item to be processed. A trust value is then selected from a set of data trust values representing a plurality of different levels of trust, the selected trust value being representative of the determined level of trust in the data item. The selected trust value is then assigned as the first trust weight for the data item to be processed.

Next, in step 420, a second trust weight is assigned to a processing rule so as to provide a weighted processing rule. The second trust weight is chosen so as to represent a determined level of trust in the processing rule. Here, a level of trust in the processing rule is determined based on metadata associated with the processing rule. A trust value is then selected from a set of data trust values representing a plurality of different levels of trust, the selected trust value being representative of the determined level of trust in the processing rule. The selected trust value is then assigned as the second trust weight for the processing rule.

The weighted data item is then processed in accordance with the weighted processing rule in step 430 so as to generate a data output and an indication of a level of trust in the data output. Here, the first and second trust weights are executed in accordance with an algorithm which generates the indication of a level of trust in the data output. In other words, the algorithm takes account of the level of trust of both the data item and the processing rule so as to generate the indication of trust.

In one illustrative embodiment, a method is provided for indicating the trustworthiness of data that has been processed in accordance with a processing rule. The illustrative embodiment assigns a first trust weight to a data item to be processed to provide a weighted data item, the first trust weight representing a level of trust in the data item. The illustrative embodiment also assigns a second trust weight to the processing rule to provide a weighted processing rule, the second trust weight representing a level of trust in the processing rule. The illustrative embodiment processes the weighted data item in accordance with the weighted processing rule to generate a data output and an indication of a level of trust in the data output.

In an embodiment, the step of processing the weighted data item in accordance with the weighted processing rule may comprise: executing the first and second trust weights in accordance with an algorithm to generate the indication of a level of trust in the data output.

In an embodiment, the step of assigning a first trust weight may comprise: selecting a trust value from a set of data trust values representing a plurality of different levels of trust associated with data, the selected trust value being representative of a determined level of trust in the data item to be processed; defining the selected trust value as the first trust weight; and associating the first trust weight with the data item to be processed.

The step of assigning a first trust weight may comprise determining a level of trust in the data item to be processed based on metadata associated with the data item to be processed. The metadata associated with the data item to be processed may comprise information regarding at least one of: a source of the data item; a time associated with the data item; a date associated with the data item; a creator of the data item; and an age of the data item.

The step of assigning a second trust weight may comprise: selecting a trust value from a set of rule trust values representing a plurality of different levels of trust associated with processing rules, the selected trust value being representative of a determined level of trust in the processing rule; defining the selected trust value as the second trust weight; and associating the second trust weight with the processing rule.

The step of assigning a second trust weight may comprise: determining a level of trust in the processing rule based on metadata associated with the processing rule. The metadata associated with the processing rule may comprise information regarding at least one of: an author of the processing rule; a time associated with the processing rule; a date associated with the processing rule; the complexity of the processing rule; and an age of the processing rule.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system or apparatus is provided. The system or apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for indicating a trustworthiness of data processed in accordance with a processing rule, the computer-implemented method comprising:
    assigning, by one or more processors, a first trust weight to a data item to be processed to provide a weighted data item, the first trust weight representing a level of trust in the data item;
    assigning, by one or more processors, a second trust weight to the processing rule to provide a weighted processing rule, the second trust weight representing a level of trust in the processing rule, wherein said assigning the second trust weight comprises:
        selecting, by one or more processors, a trust value from a set of rule trust values representing a plurality of different levels of trust associated with processing rules, the selected trust value being representative of a determined level of trust in the processing rule;
        defining, by one or more processors, the selected trust value as the second trust weight; and
        associating, by one or more processors, the second trust weight with the processing rule; and
    processing, by one or more processors, the weighted data item in accordance with the weighted processing rule to generate a data output and an indication of a level of trust in the data output.

2. The computer-implemented method of claim 1, wherein the step of processing the weighted data item in accordance with the weighted processing rule comprises:
    executing, by one or more processors, the first and second trust weights in accordance with an algorithm to generate the indication of a level of trust in the data output.

3. The computer-implemented method of claim 1, wherein the step of assigning a first trust weight comprises:
    selecting, by one or more processors, a trust value from a set of data trust values representing a plurality of different levels of trust associated with data, the selected trust value being representative of a determined level of trust in the data item to be processed;
    defining, by one or more processors, the selected trust value as the first trust weight; and
    associating, by one or more processors, the first trust weight with the data item to be processed.

4. The computer-implemented method of claim 1, wherein the step of assigning a first trust weight comprises:
    determining, by one or more processors, a level of trust in the data item to be processed based on metadata associated with the data item to be processed.

5. The computer-implemented method of claim 4, wherein the metadata associated with the data item to be processed comprises information regarding at least one of: a source of the data item; a time associated with the data item; a date associated with the data item; a creator of the data item; and an age of the data item.

6. The computer-implemented method of claim 1, wherein the step of assigning a second trust weight comprises:
    determining, by one or more processors, a level of trust in the processing rule based on metadata associated with the processing rule.

7. The computer-implemented method of claim 6, wherein the metadata associated with the processing rule comprises information regarding: an author of the processing rule; a time associated with the processing rule; a date associated with the processing rule; the complexity of the processing rule; and an age of the processing rule.

8. The computer-implemented method of claim 1, wherein a level of trust is represented using Subjective Logic.

9. The computer-implemented method of claim 1, further comprising:
    multiplying, by one or more processors, the first trust weight by the second trust weight to derive a multiplied trust weight; and
    setting, by one or more processors, the multiplied trust weight as a trust level for the data output.

10. The computer-implemented method of claim 1, further comprising:
    averaging, by one or more processors, the first trust weight and the second trust weight to derive an average trust weight; and
    setting, by one or more processors, the average trust weight as a trust level for the data output.

11. An apparatus for indicating a trustworthiness of data processed in accordance with a processing rule, the apparatus comprising:
    a data weighting hardware unit adapted to assign a first trust weight to a data item to be processed to provide a weighted data item, the first trust weight representing a level of trust in the data item;
    a processing rule weighting hardware unit adapted to assign a second trust weight to the processing rule to provide a weighted processing rule, the second trust weight representing a level of trust in the processing rule, wherein assigning the second trust weight comprises:
        selecting, by one or more processors, a trust value from a set of rule trust values representing a plurality of different levels of trust associated with processing rules, the selected trust value being representative of a determined level of trust in the processing rule;
        defining, by one or more processors, the selected trust value as the second trust weight; and
        associating, by one or more processors, the second trust weight with the processing rule; and
    a processing hardware unit adapted to process the weighted data item in accordance with the weighted processing rule to generate a data output and an indication of a level of trust in the data output.

12. The apparatus of claim 11, wherein the processing hardware unit is adapted to execute the first and second trust weights in accordance with an algorithm to generate the indication of a level of trust in the data output.

13. The apparatus of claim 11, wherein the data weighting hardware unit is adapted to:
    select a trust value from a set of data trust values representing a plurality of different levels of trust associated with data, the selected trust value being representative of a determined level of trust in the data item to be processed;
    define the selected trust value as the first trust weight; and
    associate the first trust weight with the data item to be processed.

14. A computer program product for indicating a trustworthiness of data processed in accordance with a processing rule, the computer program product comprising a non-transitory computer readable storage medium having program code embodied therewith, wherein the computer readable storage medium is not a transitory signal per se, and wherein the program code is readable and executable by a processor to perform a method comprising:
    assigning a first trust weight to a data item to be processed to provide a weighted data item, the first trust weight representing a level of trust in the data item;
    assigning a second trust weight to the processing rule to provide a weighted processing rule, the second trust weight representing a level of trust in the processing rule, wherein said assigning the second trust weight comprises:
        selecting a trust value from a set of rule trust values representing a plurality of different levels of trust associated with processing rules, the selected trust value being representative of a determined level of trust in the processing rule;
        defining the selected trust value as the second trust weight; and
        associating the second trust weight with the processing rule; and
    processing the weighted data item in accordance with the weighted processing rule to generate a data output and an indication of a level of trust in the data output.

15. The computer program product of claim 14, wherein the step of processing the weighted data item in accordance with the weighted processing rule comprises:
    executing the first and second trust weights in accordance with an algorithm to generate the indication of a level of trust in the data output.

16. The computer program product of claim 14, wherein the step of assigning a first trust weight comprises:
    selecting a trust value from a set of data trust values representing a plurality of different levels of trust associated with data, the selected trust value being representative of a determined level of trust in the data item to be processed;
    defining the selected trust value as the first trust weight; and
    associating the first trust weight with the data item to be processed.

17. The computer program product of claim 14, wherein the step of assigning a first trust weight comprises:
    determining a level of trust in the data item to be processed based on metadata associated with the data item to be processed.

18. The computer program product of claim 17, wherein the metadata associated with the data item to be processed comprises information regarding at least one of: a source of the data item; a time associated with the data item; a date associated with the data item; a creator of the data item; and an age of the data item.

* * * * *